June 11, 1963
H. E. ZANKEY
3,093,466
APPARATUS FOR THE TREATMENT OF GASES
Filed July 15, 1959
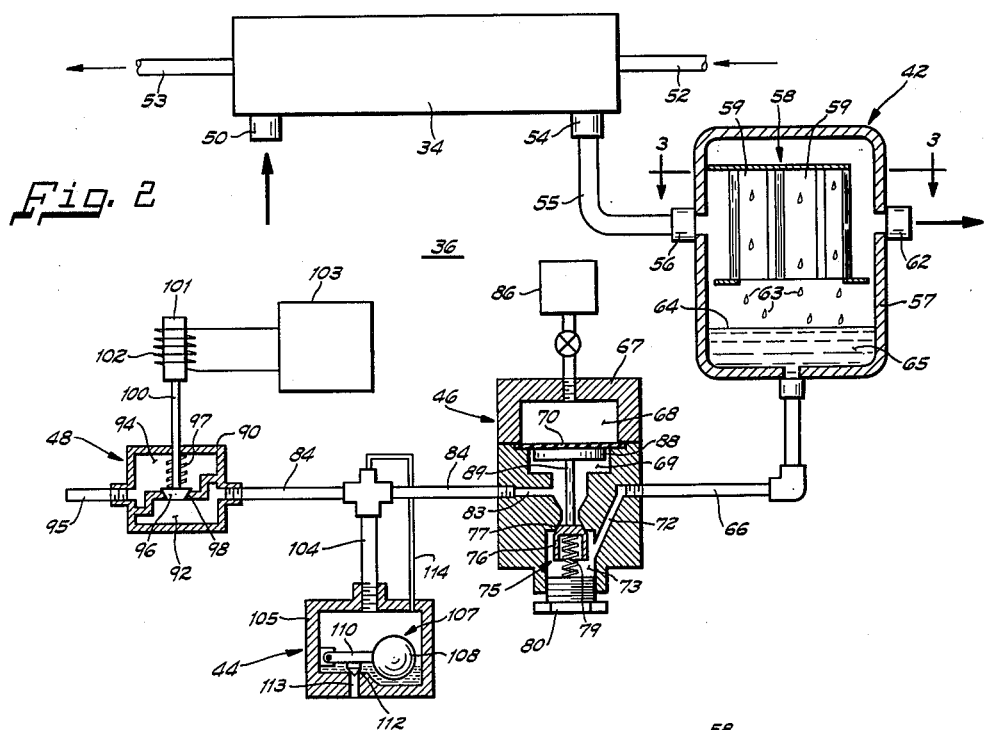
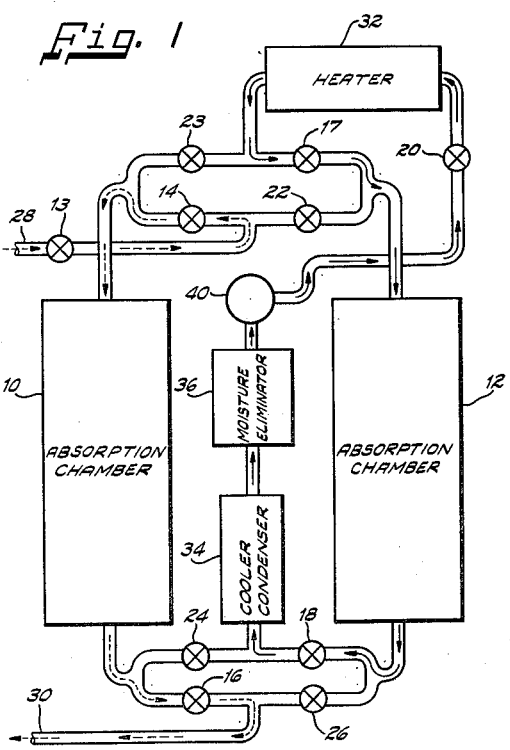
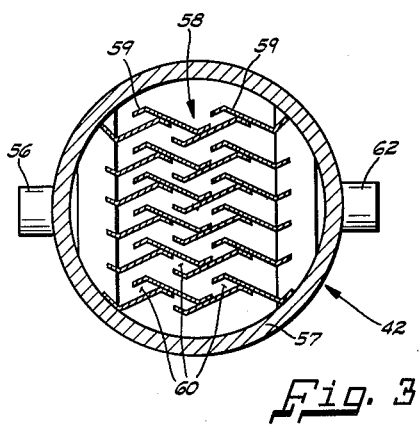
INVENTOR.
Harry E. Zankey
BY
Fred Wiviott
Attorney

United States Patent Office 3,093,466
Patented June 11, 1963

3,093,466
APPARATUS FOR THE TREATMENT OF GASES
Harry E. Zankey, Pittsburgh, Pa., assignor to McGraw-Edison Company, Milwaukee, Wis., a corporation of Delaware
Filed July 15, 1959, Ser. No. 827,241
12 Claims. (Cl. 55—169)

This invention relates to apparatus for the treatment of gases and more particularly to moisture eliminating apparatus having particular but not exclusive application in an air drying system.

Apparatus for the drying or purifying of gas by the general method of contacting it with an adsorptive material is well known. In systems of this type, the gas to be treated is passed for a period of time through an absorber unit until the adsorptive material becomes contaminated with moisture or other impurities to the point where the safe limit of its adsorptive capacity is reached. At this point the flow of gas to be treated is stopped and the unit is then reactivated. This is accomplished by circulating heated, moisture-free reactivating gas, such as air, through the adsorptive material so that the adsorbed impurities and moisture are evaporated and carried away. The moisture laden reactivating gas is then cooled and passed through a moisture eliminating apparatus before it is again heated and recirculated through the adsorptive material. If continuous operation is desired, a pair of adsorption chambers may be utilized, one of which is in use while the other is being reactivated.

In prior art high pressure gas drying systems high pressure condensate traps were utilized in removing moisture from the gas following its passage through the adsorption chamber undergoing reactivation. Such high pressure condensate traps are extremely expensive.

It is an object of the invention to provide relatively low cost condensate elimination apparatus for high pressure gas systems.

Another object of the invention is to provide a condensate elimination system for high pressure gas systems which utilizes a relatively low cost, low pressure condensate trap.

It is a further object of the invention to provide a new and improved moisture elimination system for the reactivating apparatus of a high pressure gas drying system.

These and other objects of the invention will become apparent from the detailed description of the invention taken in conjunction with the drawings in which:

FIG. 1 schematically illustrates a high pressure gas drying system in which the instant invention may be utilized;

FIG. 2 shows a condensate elimination apparatus according to the instant invention; and FIG. 3 shows a cross-sectional view taken along lines 3—3 of FIG. 2.

In general terms, the invention comprises apparatus for removing moisture from a high pressure gas system and includes low pressure condensate trap means, pressure reducing valve means disposed between the system and the condensate trap means for regulating the pressure at said condensate trap means. More specifically, the invention also includes control means for periodically opening the valve means to connect said moisture separating means to said condensate trap means so that the condensate is periodically discharged and for reclosing the valve means after said discharging has completed.

In the preferred embodiment of the invention the low pressure condensate trap has a ball float valve which normally maintains a condensate drain closed and the control means has an inlet connected to the condensate reservoir and an outlet connected to the condensate trap, and wherein pressure reducing valve means is disposed between said inlet and outlet. The control means also includes a chamber, a diaphragm separating the chamber from the outlet and mechanically connected to the valve for opening the same when the ratio of outlet pressure to chamber pressure falls below a predetermined value. In addition, venting means is connected to the outlet to initiate operation by causing a drop in the outlet pressure. By utilizing a low pressure condensate trap in this manner it has been found that savings as high as 85% can be realized over the cost of a high pressure condensate trap.

In operation, the venting means, which may comprise a solenoid operated valve connected to any suitable timing circuit, will open periodically to vent the control means outlet. This results in the opening of the valve means so that the condensate may begin flowing from the system to the low pressure condensate trap. When the fluid level in the condensate trap reaches a predetermined level the ball-float-controlled drain opens, allowing the condensate to discharge. This creates a vent in the system which prevents the valve means from reclosing. After all the condensate has discharged through the condensate trap, the ball-float drain closes to enable the outlet pressure to build up sufficiently to close the valve means which remains closed until the solenoid valve is again operated to vent the low pressure side of the device.

Referring now to the drawings in greater detail, FIG. 1 shows a high pressure gas drying system incorporating the present invention. The system shown is of the dual adsorption chamber type and includes a first adsorption chamber 10 and a second adsorption chamber 12, each containing a material having a high affinity for water molecules, such as, activated alumina. In dual adsorption systems, it is possible to reactivate one of the adsorption chambers while the other is being used, thereby allowing continuous operation. For this purpose, a system of duct work and valves, schematically illustrated in FIG. 1, are provided to maintain the flow of gas undergoing treatment through one adsorption chamber and a flow of reactivating gas through the other. It can be seen from FIG. 1 that by maintaining valves 13, 14 and 16 open and valves 22, 23, 24 and 26 closed, the flow of gas being treated (represented in the drawing by dashed arrows) will be from the inlet pipe 28 through the first adsorption chamber 10 and then through the outlet pipe 30. Similarly, by maintaining valves 17, 18 and 20 open, the flow of reactivating gas (represented) by the full arrows in FIG. 1) will be from the gas heating unit 32 which heats the gas to improve its moisture evaporating properties; through the second adsorption chamber 12 where it removes the water molecules held by the adsorbing material therein; through a cooler condenser unit 34 which causes the water molecules to condense into droplets; through the moisture eliminating apparatus 36 according to the instant invention; and lastly through a suitable blower 40 whose output is connected to the heating unit 32.

As shown in FIG. 2, when the moisture eliminating apparatus 36, according to the instant invention is utilized in a gas dryer, it is coupled to the gas stream through a moisture separator 42 for removing moisture from the gas stream, and includes a low pressure condensate trap 44 connected to the moisture separator 42 for discharging the moisture collected therein; a pressure reducing and control valve 46 disposed between moisture separator 42 and the low pressure condensate trap 44 for reducing the pressure at said condensate trap and for controlling the flow of condensate between the moisture separator and the condensate trap; and a solenoid operated valve 48 connected to low pressure side of pressure reducing and control valve 46 for venting said low pressure side to initiate operation of the device.

As the moisture laden gas leaves the adsorption chamber undergoing reactivation it enters gas inlet 50 of cooler condenser 34 wherein the water molecules are condensed to droplets by the action of a suitable cooling fluid flowing between inlet and outlet pipe 52 and 53 of a heat exchanging unit disposed within the cooler condenser 34. The moisture laden gas then discharges from the gas outlet 54 of the cooler condenser 34 and flows via conduit 55 to the inlet 56 of the moisture separator 42.

Moisture separator 42 includes a housing portion 57, a baffle portion 58 disposed adjacent inlet 56 and a condensate reservoir 64 located below the baffle portion 58. As can be seen from the cross-sectional view of the moisture separator 42 shown in FIG. 3 the baffle portion 58 comprises a plurality of zigzag baffle plates which are disposed in the general direction of the gas flow and each of which is composed of a plurality of segments 59. The end of each segment 59 is connected intermediate the ends of the next succeeding segment so that a pocket 60 is formed at the junction of each pair of segments and extends into the gas stream. Hence, as the gas flows between inlet pipe 56 and outlet pipe 62 it is forced to radically change directions as it encounters each of the pockets 60. The water droplets, on the other hand, being much heavier than the air molecules, are unable to change direction as rapidly so that they are caught in the pockets 60 and collect on the walls of segments 59. Referring again to FIG. 2, the droplets 63 of condensed moisture then flow down the sides of the baffle plates 59 and collect in the condensate reservoir 64 below.

The pressure reducing and control valve 46 is connected to the condensate reservoir 64 by conduit 66 and includes a hollow body member 67 which is divided into an upper chamber 68 and a lower chamber 69 by the diaphragm 70. An inlet passage 72 is connected to conduit 66 and opens into a cavity 73 formed in the lower end of the body member 67 and which is separated from the lower chamber 69 by a valve asembly 75. The valve assembly 75 includes a valve member 76, a valve seat 77 formed in the lower end of body portion 67, a biasing spring 79 which urges valve member 76 against valve seat 77 and a biasing spring adjusting plug 80 which is threaded into the lower end of cavity 73 for engaging the biasing spring 79 as well as to form a closure for the lower end of said cavity. An outlet passage 83 communicating with lower chamber 69 is formed in body member 67 and is connected to condensate trap 44 by conduit 84. As will be seen from the ensuing description, condensate 65 is prevented from flowing to recess 73 by the system gas which fills conduit 66.

Valve member 76 and seat 77 are so proportioned and arranged that when valve 75 is opened and gas is flowing therethrough, the restricted opening formed thereby between lower chamber 69 and recess 73 will cause a pressure drop to occur thereacross. As a result, the pressure at the outlet 83 of lower chamber 69 will be substantially reduced with respect to that which appears at inlet 72 of cavity 73. This pressure drop will be determined by the relative sizes of and the displacement between the valve member 76 and the valve seat 77.

In order to control the position of valve member 76, the upper chamber 68 of the pressure reducing and control valve 46 is connected to a source of known pressure 86 while the pressure in the lower chamber 69 is equal to the inlet pressure as reduced by its passage past valve 75. The diaphragm 70 is mechanically connected to valve member 76 by means of a valve plate 88 secured to its lower side and a pin 89 secured at one end to plate member 88 and at its other end to the valve member 76. It will be appreciated that the deflection of diaphragm 70, and hence, the position of valve member 76 relative to valve seat 77, will be governed by the difference between the upward force exerted by the pressure in lower chamber 69 and biasing spring 79 and the downward force exerted by the pressure in upper chamber 68. It can be seen that because the position of valve member 76 determines the pressure drop between cavity 73 and lower chamber 69, and hence, the pressure in lower chamber 69, by suitably adjusting the pressure in upper chamber 68 and biasing spring 79, the pressure in lower chamber 69 may, within limits, be held to any given value. If this given value is exceeded valve member 76 will be moved toward closed position by the upward deflection of diaphragm 70 thereby reducing the area of the opening between cavity 73 and lower chamber 69 to raise the pressure drop across valve 75 and decrease the pressure in lower chamber 69. This continues until a balanced position is reached or until valve 75 closes. Similarly, should the pressure in lower chamber 69 fall below this given value, valve member 76 will be moved toward open position, thereby increasing the pressure in lower chamber 69 until balance is again achieved.

Conduit 84, which is connected to output opening 83, is normally closed by solenoid operated valve 48 so that the pressure in lower chamber 69 will increase steadily as long as valve 75 is open. Consequently, as the pressure in chamber 69 increases diaphragm 70 will slowly deflect upwardly moving valve member 76 toward closed position. When the pressure in this chamber just reaches a predetermined preset value, valve 75 will close.

The solenoid operated valve 48 includes a valve body 90 having a lower portion 92 which is connected to conduit 84, an upper portion 94 which is vented to the atmosphere by outlet 95, and a valve member 96 which is urged by a biasing spring 97 toward a valve seat 98 which separates the lower and upper chambers 92 and 94, respectively. A carrier bar 100 connects valve member 96 to the magnetic plunger 101 of a solenoid whose coil 102 is connected to a suitable timing device 103 which periodically energizes coil 102 to attract magnetic plunger 101 upwardly in opposition to the biasing force of spring 97 thereby moving valve member 96 away from valve seat 98. This in turn vents conduit 84 to the atmosphere through lower chamber 92, upper chamber 94 and outlet 95.

The low pressure condensate trap 44 is also connected to conduit 84 by a pipe 104 and includes a hollow housing 105 and a ball float valve assembly 106 comprising a ball float 108 which is pivotally connected to the side of housing 105 by a pivot arm 110. When the condensate level in casing 105 rises above a predetermined point, ball float 107 will be buoyed upwardly to rotate pivot arm 110 in a counterclockwise direction opening valve 112 and allowing the condensate to drain off through drain 113. A pressure equalizing coupling 114 connects the upper end of pipe 104 to the interior of casing 105 so that the air within casing 105 will be able to escape as the condensate flows down pipe 104.

When the device is initially placed in operation a portion of the initial gas flowing through the system is conducted through conduit 66 to inlet 72 of cavity 73 and past valve 75 where it undergoes a pressure drop. It will be recalled that as the pressure in chamber 69 rises, valve member 76 will be moved toward closed position until the preset pressure of the device is equalled whereupon valve 75 will close. A quantity of gas is then trapped in conduit 66 so that as condensate begins to collect in condensate reservoir 65 it is prevented from flowing to cavity 73.

After a predetermined interval the timing device 104 will energize solenoid coil 102 thereby attracting magnetic plunger 101 upwardly to vent lower chamber 69 to the atmosphere. This causes a pressure drop in the lower chamber 69 which allows diaphragm 70 to deflect downwardly opening valve 75. The pressure in housing 57 of moisture separator 42 then forces the condensate 65 through conduit 66, inlet 72, cavity 73, past valve 75, through conduits 84 and 104 and into condensate trap 44. As the fluid level in condensate trap 44 rises ball float 107 will be raised to rotate pivot arm 110 in a counterclockwise direction thereby opening valve 112 and allowing condensate to drain off through drain 113. This will continue until all of the fluid is drained from condensate reservoir 64 whereupon valve 112 will close. In the meantime solenoid coil 102 will be de-energized allowing biasing spring 97 to reseat valve member 96. After the last portion of the fluid has cleared lower chamber 69 and valve 112 has closed, the pressure therein will again be built up by the gas flowing behind condensate 65 to a point where it again equals the preset pressure of the device. Upon this event, valve 75 will again close to trap a quantity of gas in conduit 66 so that the condensate 65 may again accumulate in condensate trap 64 prior to another discharging operation.

While the moisture separating apparatus is shown and described with reference to a gas drying system it will be appreciated that it is usable in other types of high pressure systems as well. For example, the above described condensate elemination apparatus has application in high pressure hydrogen compressors to discharge water and oil which tends to collect therein; in high pressure steam boilers to remove water which may collect during shutdowns and the like; and in high pressure natural gas lines to separate oil which may exist therein.

It will be further appreciated that while only one embodiment of the invention is shown and described a number of modifications will become apparent to those skilled in the art once applicant's disclosure is known. Accordingly, it is intended to cover in the appended claims all such applications and embodiments which fall within the true spirit of the invention.

I claim:

1. Means for removing moisture from a high pressure gas system including moisture separating means disposed in said system for removing moisture from the gas therein and condensing the same, low pressure condensate discharge means, control means having an inlet connected to said system and an outlet connected to said discharge means, said control means including pressure reducing means and being periodically operable to connect said discharging means to said system, said control means also being operable in response to said high pressure gas to disconnect said discharge means from said system after all the condensate in said system has passed through said discharge means.

2. Means for removing moisture from a high pressure gas system including moisture separating means disposed in said system for removing moisture from the gas therein and condensing the same, low pressure condensate discharging means, pressure reducing valve means having an inlet connected to said moisture separating means and an outlet connected to said discharging means for reducing the pressure at said outlet, control means for periodically opening said valve means to connect said moisture separating means to said discharging means so that said condensate is periodically discharged, said control means also being operable in response to said high pressure gas to close said valve means and disconnect said discharge means from said system after all the condensate in said system has passed to said discharging means.

3. Means for removing moisture from a high pressure gas system including moisture separating means disposed in said system for removing moisture from the gas therein and condensing the same, low pressure condensate discharging means, control means having an inlet connected to said moisture separating means and an outlet connected to said discharging means, said control means also having pressure reducing valve means disposed between said inlet and said outlet and operable in response to said outlet pressure to connect said moisture separating means to said discharge means so that said condensate is discharged when the pressure at said outlet falls below a predetermined reduced pressure and also operable to disconnect said moisture separating means and said discharge means when said outlet pressure equals said predetermined reduced pressure, and means connected to said outlet for periodically venting it to reduce the pressure thereat so that said condensate is periodically discharged from said moisture separating means.

4. Means for removing moisture from a high pressure gas system including a moisture separator disposed in said system for removing moisture from the gas therein and condensing the same, low pressure condensate trap means for discharging condensate when its level therein exceeds a predetermined value, control means having an inlet connected to said moisture separator and an outlet connected to said condensate trap means, said control means also having pressure reducing valve means disposed between said inlet and said outlet for reducing the pressure at said outlet, said control means being operable in response to said outlet pressure to connect said moisture separator to said condensate trap means so that said condensate is discharged when the pressure at said outlet falls below said reduced pressure and also operable to disconnect said moisture separator and trap means when said outlet pressure equals said reduced pressure, and means connected to said outlet for periodically venting said outlet to reduce the pressure thereat so that said condensate is periodically discharged from said moisture separator and for automatically resealing said outlet after said condensate has discharged so that said outlet pressure is raised sufficiently to effect the disconnection of said moisture separator and said trap means.

5. In a high pressure gas system, the combination of, a moisture separator having moisture separating means disposed in the path of said gas and a condensate reservoir for collecting the condensate removed therefrom, low pressure condensate trap means having float operated valve means for draining said condensate when the condensate level therein exceeds a predetermined value, control means having an inlet connected to said condensate reservoir and an outlet connected to said condensate trap, said control means also having pressure reducing valve means disposed between said inlet and said outlet for reducing the pressure at said outlet, said control means being operable in response to said outlet presure to open said valve means and connect said condensate reservoir to said condensate trap means so that said condensate is discharged when the pressure at said outlet falls below said reduced pressure and also for closing said valve means to disconnect said condensate reservoir and trap means when said outlet pressure equals said reduced pressure, and relief valve means connected to said outlet for periodically reducing the pressure thereat so that said pressure reducing valve means is periodically opened and said condensate discharged from said condensate reservoir.

6. In a high pressure gas drying system of the adsorption type having adsorber reactivating means for passing reactivating gas through the adsorber, the combination of, a moisture separator in said reactivating means having moisture separating means disposed in the path of said reactivating gas and a condensate reservoir for collecting the condensate removed therefrom, low pressure condensate trap means having ball float valve means for discharging said condensate when the condensate level therein reaches a predetermined height, control means having an inlet connected to said condensate reservoir and an outlet connected to said condensate trap, said control means also having chamber means and pressure reducing valve means disposed between said inlet and said outlet for reducing said system pressure and for connecting said condensate reservoir to said condensate trap means, diaphragm means in communication with said outlet and connected to said valve means for opening the same to allow the discharge of said condensate when the pressure at said outlet falls below said reduced presure and also for closing said valve means to disconnect said condensate reservoir from said low pressure condensate trap means when said outlet pressure equals said reduced pressure, and relief valve means connected to said outlet for periodically venting said outlet to reduce the pressure thereat so that said condensate is periodically discharged from said condensate reservoir to raise the condensate level in said condensate trap means and thereby open said ball float valve means, said ball float valve means reclosing after substantially all of said condensate has discharged therethrough to reseal said outlet, whereby said outlet pressure is raised sufficiently to effect disconnection of said condensate reservoir and said trap means.

7. In a high pressure gas drying system of the adsorption type having adsorber reactivating means for passing reactivating gas through an adsorber, the combination of a moisture separator in said reactivating means having moisture separating means disposed in the path of said reactivating gas and a condensate reservoir for collecting the condensate removed therefrom, low pressure condensate trap means having ball float valve means for discharging said condensate when the condensate level therein reaches a predetermined height, control means having an inlet connected to said condensate reservoir and an outlet connected to said condensate trap, said control means also having chamber means and pressure reducing valve means disposed between said inlet and said outlet for reducing said system pressure and for connecting said condensate reservoir to said condensate trap means, diaphragm means in communication with said outlet and connected to said valve means for opening the same to allow the discharge of said condensate when the ratio of the pressure in said chamber to said outlet pressure falls below a predetermined value and also for closing said valve means when said ratio rises to a predetermined value, and means periodically reducing said ratio so that said condensate is periodically discharged from said condensate reservoir.

8. Means for removing condensate from a high pressure gas system including low pressure condensate discharge means, control means having an inlet connected to said system and an outlet connected to said discharge means, said control means also having pressure reducing valve means disposed between said inlet and said outlet and operable in response to outlet pressure to connect said discharge means to said system so that said condensate is discharged when the pressure at said outlet falls below a predetermined reduced pressure and also operable to disconnect said discharge means from said system when said outlet pressure equals said predetermined reduced pressure, and means connected to said outlet for periodically reducing said output pressure so that said condensate is periodically discharged from said system.

9. Means for removing moisture from a high pressure gas system including, moisture collecting means connected to said system, low pressure condensate discharging means, pressure reducing valve means having an inlet connected to said moisture collecting means and an outlet connected to said discharging means for reducing the pressure at said outlet, control means for periodically opening said valve means to connect said moisture collecting means to said discharging means so that said condensate is periodically discharged, said control means also being operable in response to said high pressure gas to close said valve means and disconnect said discharging means from said system after all the condensate in said system has passed to said discharging means.

10. Means for removing condensate from a high pressure gas system including low pressure condensate discharging means, control means having an inlet connected to said system and an outlet connected to said discharging means, said control means also having pressure reducing valve means disposed between said inlet and said outlet and operable in response to said outlet pressure to connect said discharge means to said system so that said condensate is discharged when the pressure at said outlet falls below a predetermined reduced pressure and also operable to disconnect said discharge means from said system when said outlet pressure equals said predetermined reduced pressure, and means connected to said outlet for periodically venting it to reduce the pressure thereat so that said condensate is periodically discharged from said system.

11. In a high pressure system the combination of, low pressure condensate trap means having ball float valve means for draining said condensate when the condensate level therein exceeds a predetermined value, control means having an inlet connected to said system and an outlet connected to said condensate trap, said control means also having pressure reducing valve means disposed between said inlet and said outlet for reducing the pressure at said outlet, said control means being operable in response to said outlet pressure to open said valve means and connect said condensate trap means to said system so that said condensate is discharged when the pressure at said outlet falls below said reduced pressure and also for closing said valve means to disconnect said trap means from said system when said outlet pressure equals said reduced pressure, and relief valve means connected to said outlet for periodically reducing the pressure thereat so that said pressure reducing valve means is periodically opened and said condensate discharged from said system.

12. Means for removing the condensate from a high pressure gas system, low pressure condensate discharge means, control means having an inlet connected to said system and an outlet connected to said discharging means, said control means including pressure reducing means and being periodically operable to connect said discharging means to said system, said control means also being operable in response to said high pressure gas to disconnect said discharge means from said system after all the condensate in said system has passed to said discharge means.

References Cited in the file of this patent

UNITED STATES PATENTS

| | | |
|---|---|---|
| 2,348,357 | Parks | May 9, 1944 |
| 2,379,321 | Sutcliffe et al. | June 26, 1945 |
| 2,585,045 | Schmidlin | Feb. 12, 1952 |
| 2,689,624 | Davis | Sept. 21, 1954 |
| 2,758,665 | Francis | Aug. 14, 1956 |
| 2,948,352 | Walker et al. | Aug. 9, 1960 |